(12) United States Patent
Burton et al.

(10) Patent No.: US 11,240,356 B2
(45) Date of Patent: Feb. 1, 2022

(54) HEADPHONE CASE ASSEMBLY

(71) Applicants: Cheryl Burton, Scarborough (CA); Ainsworth Carter, Scarborough (CA)

(72) Inventors: Cheryl Burton, Scarborough (CA); Ainsworth Carter, Scarborough (CA)

( * ) Notice: Subject to any disclaimer, the term of this patent is extended or adjusted under 35 U.S.C. 154(b) by 38 days.

(21) Appl. No.: 16/781,089

(22) Filed: Feb. 4, 2020

(65) Prior Publication Data

US 2021/0243287 A1 Aug. 5, 2021

(51) Int. Cl.
*H04M 1/02* (2006.01)
*H04R 1/02* (2006.01)
*H04R 1/10* (2006.01)

(52) U.S. Cl.
CPC ............ *H04M 1/0258* (2013.01); *H04R 1/02* (2013.01); *H04R 1/1033* (2013.01); *H04M 2001/0204* (2013.01); *H04R 2499/11* (2013.01)

(58) Field of Classification Search
CPC ..................................... G06F 1/16; G06F 1/20
See application file for complete search history.

(56) References Cited

U.S. PATENT DOCUMENTS

| 8,485,404 | B2 | 7/2013 | Monaco | |
|---|---|---|---|---|
| 9,049,782 | B2 | 6/2015 | Koenig | |
| 2003/0157973 | A1 | 8/2003 | Yang | |
| 2011/0203954 | A1 | 8/2011 | Kroupa | |
| 2012/0077556 | A1 | 3/2012 | McKendrick | |
| 2013/0083456 | A1* | 4/2013 | Koenig | H04M 1/15 361/679.01 |
| 2013/0129138 | A1 | 5/2013 | Washington, Jr. | |
| 2015/0300561 | A1 | 10/2015 | Aichholzer | |
| 2016/0028429 | A1 | 1/2016 | Crawford | |
| 2017/0013100 | A1 | 1/2017 | Wurden | |
| 2017/0214263 | A1* | 7/2017 | Fathollahi | H02J 7/342 |

* cited by examiner

*Primary Examiner* — Jerry Wu

(57) ABSTRACT

A headphone case assembly includes a housing that has a device opening integrated therein for insertably receiving a personal electronic device. The housing has a spool chamber integrated therein. A spool is rotatably integrated into the housing. The spool is rotatable in a first direction and the spool is biased to rotate in a second direction. A pair of headphones is wrapped around the spool. The headphones can be pulled outwardly from the housing to be worn in the user's ears. The headphones are retracted into the housing when the spool rotates in the second direction. A connection cord is electrically coupled to the headphones and the connection cord is pluggable into a headphone jack in the personal electronic device. In this way the headphones receive an audio signal from the personal electronic device.

9 Claims, 4 Drawing Sheets

HEADPHONE CASE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to headphone devices and more particularly pertains to a new headphone device for retractably storing headphones on a personal electronic device.

(2) Description of Related Art Including Information Disclosed Under 37 CFR 1.97 and 1.98

The prior art relates to headphone devices.

BRIEF SUMMARY OF THE INVENTION

An embodiment of the disclosure meets the needs presented above by generally comprising a housing that has a device opening integrated therein for insertably receiving a personal electronic device. The housing has a spool chamber integrated therein. A spool is rotatably integrated into the housing. The spool is rotatable in a first direction and the spool is biased to rotate in a second direction. A pair of headphones is wrapped around the spool. The headphones can be pulled outwardly from the housing to be worn in the user's ears. The headphones are retracted into the housing when the spool rotates in the second direction. A connection cord is electrically coupled to the headphones and the connection cord is pluggable into a headphone jack in the personal electronic device. In this way the headphones receive an audio signal from the personal electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
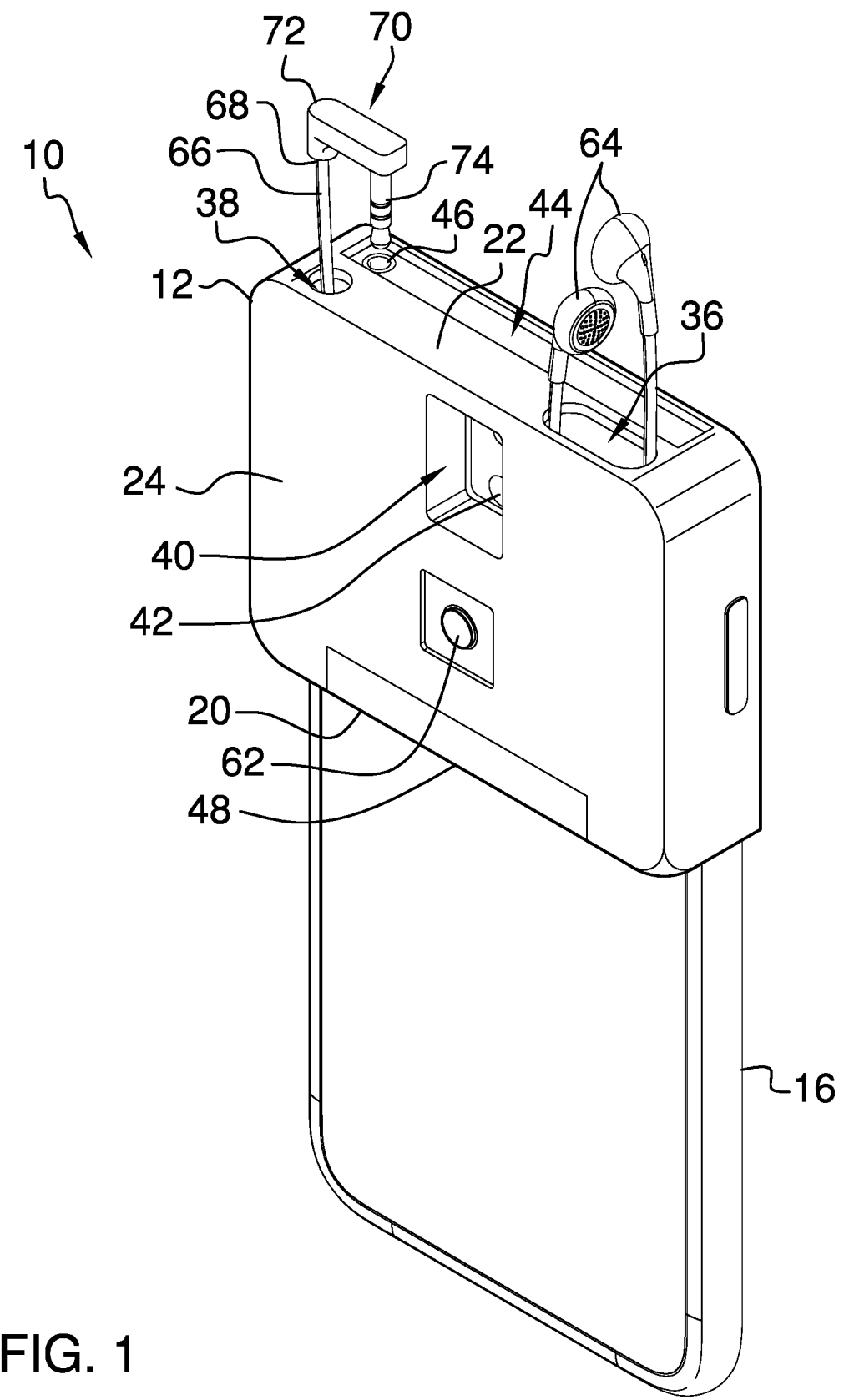
FIG. 1 is a perspective view of a headphone case assembly according to an embodiment of the disclosure.
Figure 2:
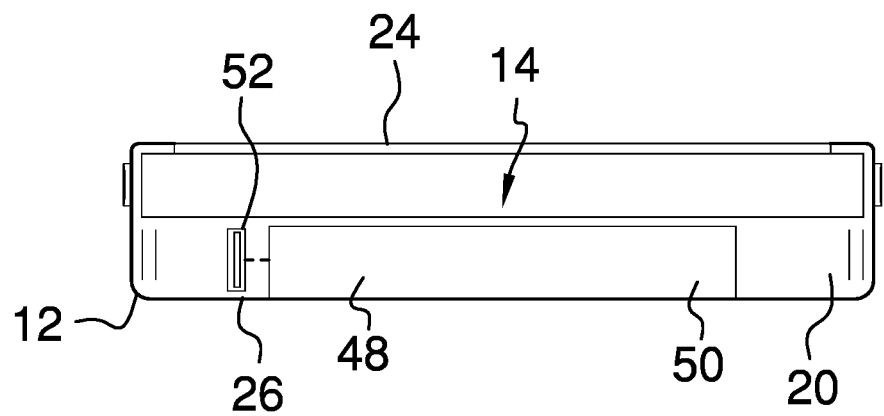
FIG. 2 is a bottom view of an embodiment of the disclosure.
Figure 3:
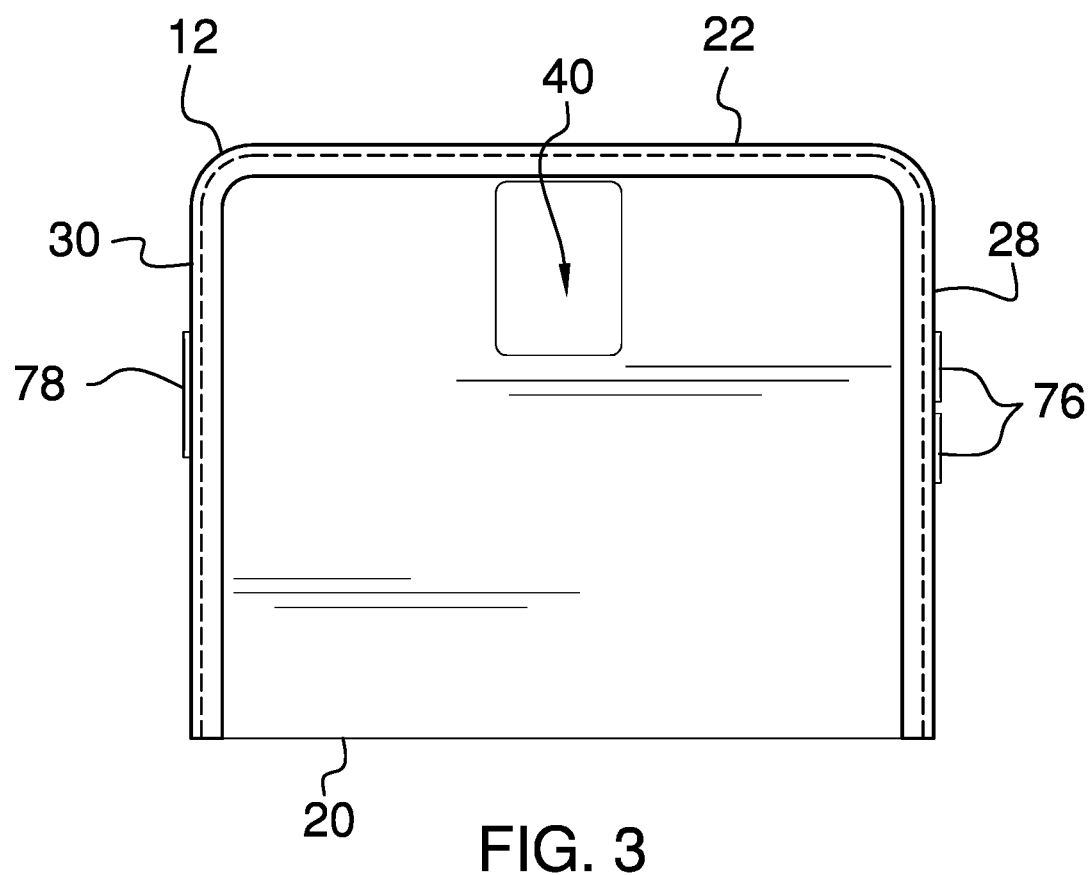
FIG. 3 is a back phantom view of an embodiment of the disclosure.
Figure 4:
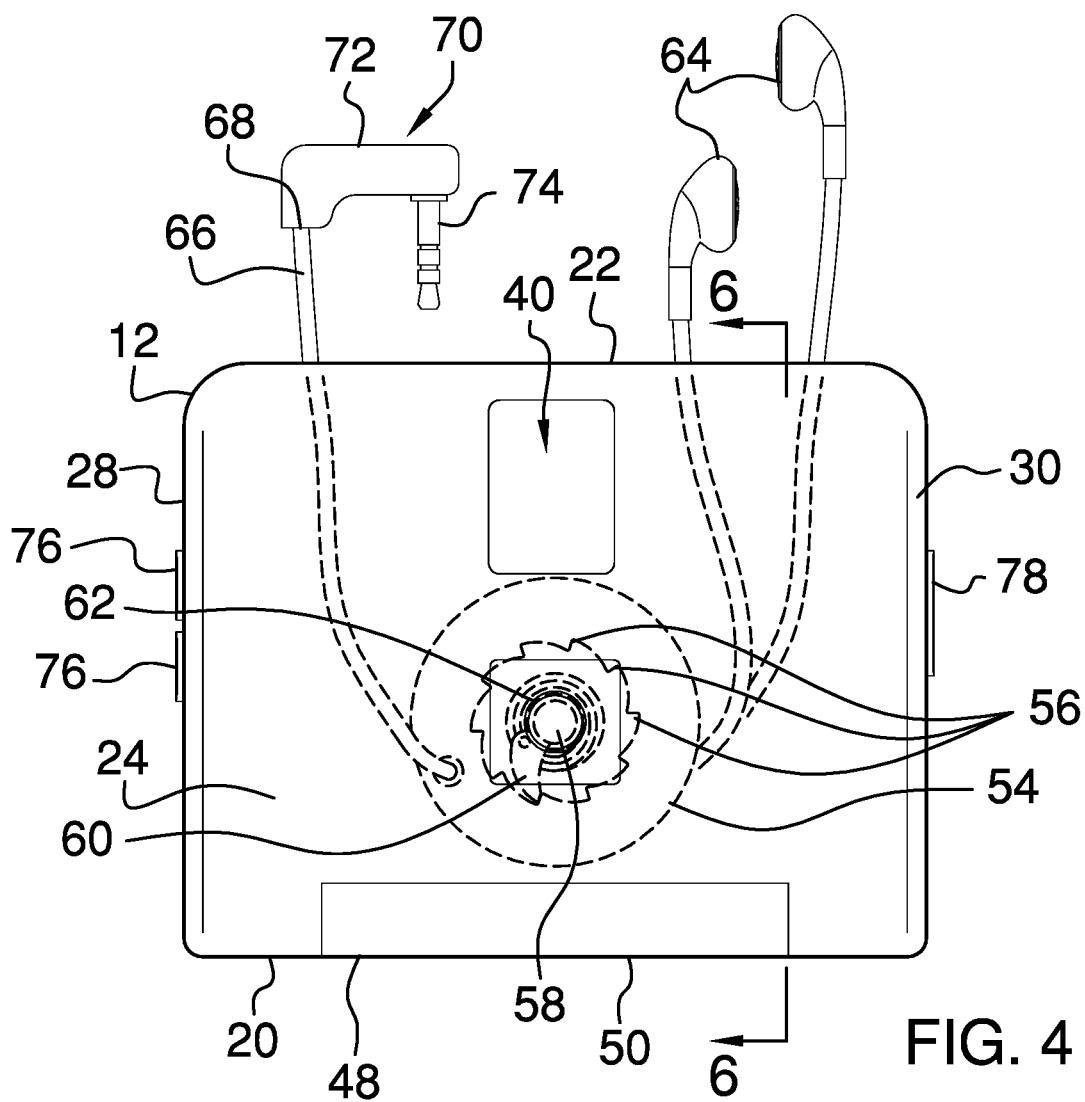
FIG. 4 is a front phantom view of an embodiment of the disclosure.
Figure 5:
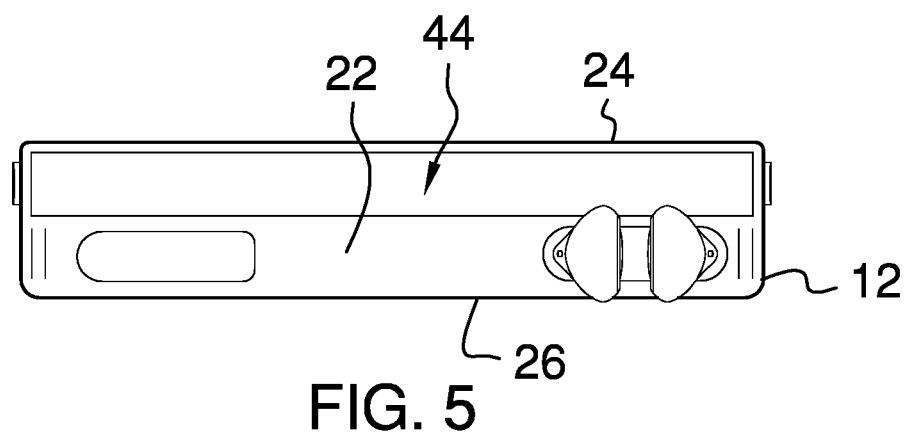
FIG. 5 is a top view of an embodiment of the disclosure.
Figure 6:
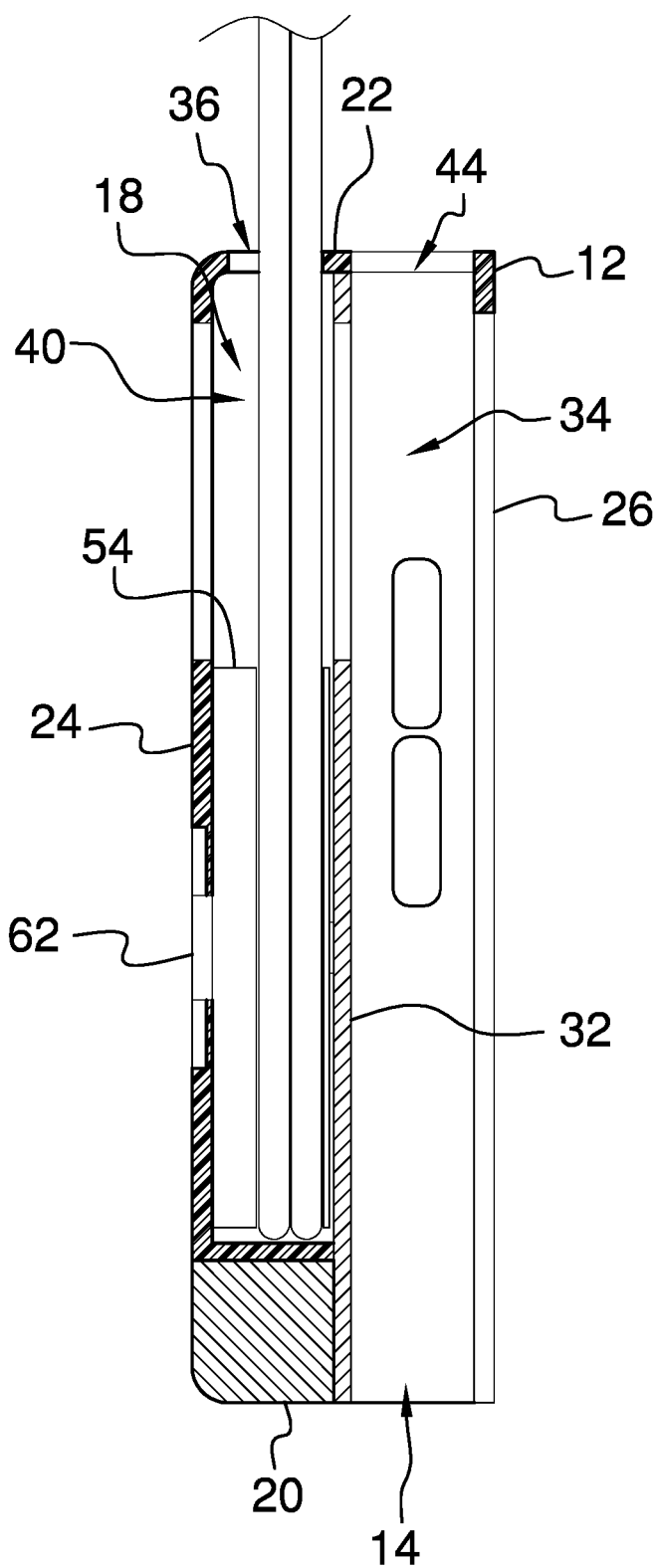
FIG. 6 is a cross sectional view taken along line 6-6 of FIG. 4 of an embodiment of the disclosure.

With reference now to the drawings, and in particular to FIGS. 1 through 6 thereof, a new headphone device embodying the principles and concepts of an embodiment of the disclosure and generally designated by the reference numeral 10 will be described.

As best illustrated in FIGS. 1 through 6, the headphone case assembly 10 generally comprises a housing 12 that has a device opening 14 being integrated therein for insertably receiving a personal electronic device 16 thereby facilitating the housing 12 to be retained on the personal electronic device 16. The personal electronic device 16 may be a smart phone of any conventional design. Additionally, the housing 12 has a spool chamber 18 integrated into the housing 12.

The housing 12 has a bottom wall 20, a top wall 22, a front wall 24, a back wall 26, a first lateral wall 28 and a second lateral wall 30. The housing 12 has a dividing wall 32 that is positioned between the front wall 24 and the back wall 26 to define the spool chamber 18 between the front wall 24 and the dividing wall 32. Moreover, the dividing wall 32 defines a device chamber 34 between the dividing wall 32 and the back wall 26. The dividing wall 32 extends between the top wall 22 and the bottom wall 20, and the dividing wall 32 extends between the first lateral wall 28 and the second lateral wall 30.

The device opening 14 extends through the bottom wall 20 into the device chamber 34 to insertably receive the personal electronic device 16. The top wall 22 has a first cord opening 36 extending into the spool chamber 18 and the top wall 22 has a second cord opening 38 extending into the spool chamber 18. The housing 12 has a camera opening 40 extending through the front wall 24 and the dividing wall 32 to expose a camera 42 on the personal electronic device 16 when the personal electronic device 16 is inserted into the device chamber 34. The top wall 22 has an access opening 44 extending into the device chamber 34 to expose a headphone jack 46 on the personal electronic device 16 when the personal electronic device 16 is inserted into the device chamber 34.

A power supply 48 is removably integrated into the housing 12. The power supply 48 is connectable to the personal electronic device 16 for charging the personal electronic device 16. The power supply 48 comprises at least one battery 50 that is removably attached to the housing 12. The power supply 48 also includes a power port 52 that is recessed into the housing 12 and the power port 52 is electrically coupled to the at least one battery 50. A charge cord, such as a micro usb cord or the like, of the personal electronic device 16 can be plugged into the power port 52 to charge the personal electronic device 16.

A spool 54 is provided and the spool 54 is rotatably integrated into the housing 12. The spool 54 is rotatable in a first direction and the spool 54 is biased to rotate in a second direction. The spool 54 might be a spring loaded spool or the like to facilitate the spool 54 to be biased to rotate in the second direction. The spool 54 is positioned within the spool chamber 18 and the spool 54 includes a plurality of engagement points 56 that are distributed around an entire circumference of the spool 54.

A locking mechanism 58 provided and the locking mechanism 58 is movably integrated into the housing 12. The locking mechanism 58 includes a finger 60 and a button 62. The finger 60 is positioned in the spool chamber 18 and the finger 60 releasably engages a respective one of the engagements on the spool 54 when the locking mechanism 58 is in a locking position. In this way the spool 54 is inhibited from rotating in the second direction. The button 62 extends outwardly through the front wall 24 of the housing 12 thereby facilitating the button 62 to be depressed by a user. The button 62 is mechanically coupled to the finger 60. The finger 60 disengages the respective engagement point 56 on the spool 54 when the button 62 is depressed thereby facilitating the spool 54 to rotate in the second direction. Additionally, the finger 60 is biased to engage the respective engagement point 56 when the button 62 is not depressed.

A pair of headphones 64 is included and the pair of headphones 64 is wrapped around the spool 54. The headphones 64 can be pulled outwardly from the housing 12 thereby facilitating the headphones 64 to be worn in the user's ears. The headphones 64 are retracted into the housing 12 when the spool 54 rotates in the second direction. Additionally, the headphones 64 extend outwardly through the first cord opening 36 in the top wall 22 of the housing 12.

A connection cord 66 is provided and the connection cord 66 is electrically coupled to the headphones 64. The connection cord 66 is pluggable into a headphone jack 46 in the personal electronic device 16 thereby facilitating the headphones 64 to receive an audio signal from the personal electronic device 16. The connection cord 66 extends outwardly through the second cord opening 38 in the top wall 22 of the housing 12. The connection cord 66 has a distal end 68 with respect to the top wall 22 and a plug 70 is electrically coupled to the distal end 68. The plug 70 includes a body 72 that is oriented perpendicular to the connection cord 66 and a contact 74 that extends downwardly from the body 72. The contact 74 extends along a line that is oriented parallel to the connection cord 66. The plug 70 is insertable into the headphone jack 46 in the personal electronic device 16.

A set of first buttons 76 is each movably coupled to the first lateral wall 28 of the housing 12. Each of the first buttons 76 is aligned with respective ones of control buttons on the personal electronic device 16 when the personal electronic device 16 is inserted into the housing 12. In this way the set of first buttons 76 facilitate the respective control buttons to be manipulated. A set of second buttons 78 is each movably coupled to the second lateral wall 30 of the housing 12. Each of the second buttons 78 is aligned with respective ones of control buttons on the personal electronic device 16 when the personal electronic device 16 is positioned in the housing 12. Thus, each of the second buttons 78 facilitate the respective control buttons to be manipulated.

In use, the personal electronic device 16 is inserted into the device opening 14 in the bottom wall 20 of the housing 12. In this way the headphones 64 are available for use with the personal electronic device 16. The plug 70 on the connection cord 66 is plugged into the headphone jack 46 on the personal electronic device 16. The headphones 64 are pulled outwardly from the housing 12 and the locking mechanism 58 inhibits the spool 54 from retracting the headphones 64 back into the housing 12. In this way the headphones 64 can be placed in the user's ears for listening to audio streamed from the personal electronic device 16. The button 62 associated with the locking mechanism 58 is depressed to retract the headphones 64 into the housing 12 when the headphones 64 are not being used.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A headphone case assembly being configured to insertably receive a personal electronic device thereby facilitating headphones to be carried with the personal electronic device, said assembly comprising: a housing having a device opening being integrated therein for insertably receiving a personal electronic device thereby facilitating said housing to be retained on the personal electronic device, said housing having a spool chamber being integrated therein, wherein said housing has a bottom wall, a top wall, a front wall, a back wall, a first lateral wall and a second lateral wall, said housing having a dividing wall being positioned between said front wall and said back wall to define said spool chamber between said front wall and said dividing wall, said dividing wall defining a device chamber between said dividing wall and said back wall, said dividing wall extending between said top wall and said bottom wall, said dividing wall extending between said first lateral wall and said second lateral wall, said first lateral wall, said second lateral wall and said dividing wall extending from said bottom wall to the top wall to define said device opening and said spool chamber such that said housing is configured for being positioned on a portion of the personal electronic device such that a second portion of the personal electronic device extends from the housing through the device opening when the personal electronic device is fully inserted into said housing; a power supply being removably integrated into said housing, said power supply being connectable to the personal electronic device for charging the personal electronic device; a spool being rotatably integrated into said housing, said spool being rotatable in a first direction, said spool being biased to rotate in a second direction; a pair of headphones, said pair of headphones being wrapped around said spool, said headphones being pullable outwardly from said housing wherein said headphones are configured to be worn in the user's ears, said headphones being retracted into said housing when said spool rotates in said second direction; and a connection cord being electrically coupled to said headphones, said connection cord being pluggable into a headphone jack in the personal electronic device thereby facilitating said headphones to receive an audio signal from the personal electronic device.

2. The assembly according to claim 1, wherein:
said a device opening extends through said bottom wall into said device chamber wherein said device opening is configured to insertably receive the personal electronic device;
said top wall has a first cord opening extending into said spool chamber;
said top wall has a second cord opening extending into said spool chamber;
said housing has a camera opening extending through said front wall and said dividing wall wherein said camera opening is configured to expose a camera on the personal electronic device when the personal electronic device is inserted into said device chamber; and
said top wall has an access opening extending into said device chamber wherein said access opening is configured to expose a headphone jack on the personal electronic device when the personal electronic device is inserted into said device chamber.

3. The assembly according to claim 1, wherein said power supply comprising:
at least one battery being removably attached to said housing; and
a power port being recessed into said housing, said power port being electrically coupled to said at least one battery, said power port having a charge cord of the personal electronic device being pluggable therein wherein said at least one battery is configured to charge the personal electronic device.

4. The assembly according to claim 2, wherein said spool is positioned within said spool chamber, said spool having a plurality of engagement points each being distributed around an entire circumference of said spool.

5. The assembly according to claim 4, further comprising a locking mechanism being movably integrated into said housing, said locking mechanism including a finger and a button, said finger releasably engaging a respective one of said engagements on said spool when said locking mechanism is in a locking position thereby inhibiting said spool from rotating in said second direction, said button extending outwardly through said front wall of said housing wherein said button is configured to be depressed by a user, said button being mechanically coupled to said finger, said finger disengaging said respective engagement point on said spool when said button is depressed thereby facilitating said spool to rotate in said second direction, said finger being biased to engage the respective engagement point when said button is not depressed.

6. The assembly according to claim 4, wherein:
said headphones extend outwardly through said first cord opening in said top wall of said housing; and
said connection cord extends outwardly through said second cord opening in said top wall of said housing, said connection cord having a distal end with respect to said top wall, said distal end having a plug being electrically coupled thereto, said plug including a body being oriented perpendicular to said connection cord and a contact extending downwardly from said body, said contact extending along a line being oriented parallel to said connection cord, said plug being insertable into the headphone jack in the personal electronic device.

7. The assembly according to claim 1, further comprising a set of first buttons, each of said first buttons being movably coupled to said first lateral wall of said housing, each of said first buttons being aligned with respective ones of control buttons on the personal electronic device when the personal electronic device is inserted into said housing wherein said set of first buttons is configured to facilitate the respective control buttons to be manipulated.

8. The assembly according to claim 7, further comprising a set of second buttons, each of said second buttons being movably coupled to said second lateral wall of said housing, each of said second buttons being aligned with respective ones of control buttons on the personal electronic device when the personal electronic device is positioned in said housing wherein each of said second buttons is configured to facilitate the respective control buttons to be manipulated.

9. A headphone case assembly being configured to insertably receive a personal electronic device thereby facilitating headphones to be carried with the personal electronic device, said assembly comprising: a housing having a device opening being integrated therein for insertably receiving a personal electronic device thereby facilitating said housing to be retained on the personal electronic device, said housing having a spool chamber being integrated therein, said housing having a bottom wall, a top wall, a front wall, a back wall, a first lateral wall and a second lateral wall, said housing having a dividing wall being positioned between said front wall and said back wall to define said spool chamber between said front wall and said dividing wall, said first lateral wall, said second lateral wall and said dividing wall extending from said bottom wall to the top wall to define said device opening and said spool chamber such that said housing is configured for being positioned on a portion of the personal electronic device such that a second portion of the personal electronic device extends from the housing through the device opening when the personal electronic device is fully inserted into said housing, said dividing wall defining a device chamber between said dividing wall and said back wall, said dividing wall extending between said top wall and said bottom wall, said dividing waill extending between said first lateral wall and said second lateral wall, said device opening extending through said bottom wall into said device chamber wherein said device opening is configured to insertably receive the personal electronic device, said top wall having a first cord opening extending into said spool chamber, said top wall having a second cord opening extending into said spool chamber, said housing having a camera opening extending through said front wall and said dividing wall wherein said camera opening is configured to expose a camera on the personal electronic device when the personal electronic device is inserted into said device chamber, said top wall having an access opening extending into said device chamber wherein said access opening is configured to expose a headphone jack on the personal electronic device when the personal electronic device is inserted into said device chamber a power supply being removably integrated into said housing, said power supply being connectable to the personal electronic device for charging the personal electronic device, said power supply comprising: at least one battery being removably attached to said housing; and a power port being recessed into said housing, said power port being electrically coupled to said at least one battery, said power port having a charge cord of the personal electronic device being pluggable therein wherein said at least one battery is configured to charge the personal electronic device: a spool being rotatably integrated into said housing, said spool being rotatable in a first direction, said spool being biased to rotate in a second direction, said spool being positioned within said spool chamber, said spool having a plurality of engagement points each being distributed around an entire circumference of said spool; a locking mechanism being movably integrated into said housing, said locking mechanism including a finger and a button, said finger releasably engaging a respective one of said engagements on said spool when said locking mechanism is in a locking position thereby inhibiting said spool from rotating in said second direction, said button extending outwardly through said front wall of said housing wherein said button is configured to be depressed by a user, said button being mechanically coupled to said finger, said finger disengaging said respective engagement point on said spool when said button is depressed thereby facilitating said spool to rotate in said second direction, said finger being biased to engage the respective engagement point when said button is not depressed; a pair of headphones, said pair of headphones being wrapped around said spool, said headphones being pullable outwardly from said housing wherein said headphones are configured to be worn in the user's ears, said headphones being retracted into said housing when said spool rotates in said second direction, said headphones extending outwardly through said first cord opening in said top wall of said housing; a connection cord being electrically coupled to said headphones, said connection cord being pluggable into a headphone jack in the personal electronic device thereby facilitating said headphones to receive an audio signal from the personal electronic device, said connection cord extending outwardly through said second cord opening in said top wall of said housing, said connection cord having a distal end with respect to said top wall, said distal end having a plug being electrically coupled thereto, said plug including a body being oriented perpendicular to said connection cord and a contact extending downwardly from said body, said contact extending along a line being oriented parallel to said connection cord, said plug being insertable into the headphone jack in the personal electronic device; a set of first buttons, each of said first buttons being movably coupled to said first lateral wall of said housing, each of said first buttons being aligned with respective ones of control buttons on the personal electronic device when the personal electronic device is inserted into said housing wherein said set of first buttons is configured to facilitate the respective control buttons to be manipulated; and a set of second buttons, each of said second buttons being movably coupled to said second lateral wall of said housing, each of said second buttons being aligned with respective ones of control buttons on the personal electronic device when the personal electronic device is positioned in said housing wherein each of said second buttons is configured to facilitate the respective control buttons to be manipulated.

\* \* \* \* \*